US009992447B2

(12) United States Patent
Singh et al.

(10) Patent No.: US 9,992,447 B2
(45) Date of Patent: Jun. 5, 2018

(54) INTER RADIO ACCESS TECHNOLOGY MANAGEMENT FOR AUDIOVISUAL CALLS

(71) Applicant: Apple Inc., Cupertino, CA (US)

(72) Inventors: Ajoy K. Singh, Milpitas, CA (US); Christopher M. Garrido, San Jose, CA (US); Luciano M. Verger, Santa Clara, CA (US); Najeeb M. Abdulrahiman, Fremont, CA (US); Srinivasan Vasudevan, San Jose, CA (US); Ming Jin, Saratoga, CA (US); David L. Biderman, San Jose, CA (US); Gurtej Singh G. Chandok, Sunnyvale, CA (US); Patrick Miauton, Redwood City, CA (US); Eric A. Allamanche, Sunnyvale, CA (US); Anil G. Naik, San Jose, CA (US); Deepak Chitlur Lakshman, San Jose, CA (US); Hsien-Po Shiang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 20 days.

(21) Appl. No.: 15/167,582

(22) Filed: May 27, 2016

(65) Prior Publication Data

US 2017/0347063 A1    Nov. 30, 2017

(51) Int. Cl.
| | |
|---|---|
| *H04N 7/14* | (2006.01) |
| *H04W 36/00* | (2009.01) |
| *H04W 36/30* | (2009.01) |
| *H04W 76/02* | (2009.01) |
| *H04W 88/06* | (2009.01) |

(52) U.S. Cl.
CPC ............. *H04N 7/147* (2013.01); *H04N 7/148* (2013.01); *H04W 36/0022* (2013.01); *H04W 36/0094* (2013.01); *H04W 36/30* (2013.01); *H04W 76/02* (2013.01); *H04W 88/06* (2013.01)

(58) Field of Classification Search
CPC ... H04N 7/147; H04N 7/148; H04W 36/0022; H04W 36/0094; H04W 36/30; H04W 76/02; H04W 76/064; H04W 76/026; H04W 36/0027; H04W 28/06;
(Continued)

(56) References Cited

U.S. PATENT DOCUMENTS 9,264,372 B2    2/2016   Stanwood et al.
9,319,948 B1 *  4/2016   Oroskar ............ H04W 36/0083
(Continued)

*Primary Examiner* — James Yang
*Assistant Examiner* — Jianxun Yang
(74) *Attorney, Agent, or Firm* — Meyertons Hood Kivlin Kowert & Goetzel, P.C.; Jeffrey C. Hood

(57) ABSTRACT

This disclosure relates to inter radio access technology management for audiovisual calls. Wireless link availability and suitability for an audiovisual call may be evaluated for each of a first radio access technology and a second radio access technology. One or more wireless links on which to establish an audiovisual call may be selected based on the evaluations. The audiovisual call may be established on the selected wireless link(s). Wireless link availability and suitability for an audiovisual call may be monitored during the audiovisual call and decisions on whether to perform handover to a different wireless link and/or media duplication on multiple wireless links may be made based on the suitability for an audiovisual call of available wireless links.

20 Claims, 7 Drawing Sheets

(58) Field of Classification Search
CPC ...... H04W 36/18; H04W 36/14; H04L 67/10;
H04M 7/006
See application file for complete search history.

(56) References Cited

U.S. PATENT DOCUMENTS

2015/0163811 A1* 6/2015 Konstantinou ..... H04W 76/026
370/329
2016/0330667 A1* 11/2016 Surmay ................ H04W 36/18

* cited by examiner

INTER RADIO ACCESS TECHNOLOGY MANAGEMENT FOR AUDIOVISUAL CALLS

FIELD

The present application relates to wireless communication systems, including techniques for inter radio access technology (iRAT) management for audiovisual calls.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others. While some techniques for coordinating between different wireless communication technologies exist, interworking mechanisms are generally not very well developed, and so improvements in the field would be desirable.

SUMMARY

Embodiments are presented herein of, inter alia, systems, methods, and apparatuses for inter radio access technology (iRAT) management for audiovisual calls.

Link quality may be more important for audiovisual calls than for voice-only calls, as audiovisual calls may use substantially more bandwidth than voice only calls, while also requiring low link latency in order to provide good performance. As link quality can change over time, particular under mobile conditions, monitoring and intelligently utilizing the wireless communication technologies available to a wireless device to perform handover between different RATs, and potentially to duplicate audiovisual call media using multiple RATs for increased robustness, may improve audiovisual call quality (e.g., on average) for a wireless device.

According to the techniques presented herein, a wireless device may monitor the suitability for audiovisual calling of wireless links according to multiple RATs. Determining the suitability of a wireless link for audiovisual calling may include monitoring and analyzing one or more metrics specific to audiovisual calling applications, one or more RAT specific metrics, and/or various metrics at multiple layers (e.g., link, transport, application), individually and/or in combination, to determine if the monitored metrics meet certain predetermined conditions indicative of the suitability (or unsuitability) of the wireless link for audiovisual calling.

Based on the determination of the suitability for audiovisual calling of wireless links to the wireless device, the wireless device may determine one or more wireless links on which to establish an audiovisual call, and may establish the audiovisual call on the selected link(s). The selected wireless link(s), and any other available wireless links (including any not initially available but that become available), may continue to be monitored for suitability for audiovisual calling during the audiovisual call, and at least in some instances decisions to handover of the audiovisual call to a different wireless link, and/or decisions to start or stop media duplication of the audiovisual call on multiple wireless links, may be made based on the ongoing monitoring of wireless links according to different RATs for suitability for audiovisual calling during the audiovisual call.

The techniques described herein may be implemented in and/or used with a number of different types of devices, including but not limited to cellular base stations, access point devices, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
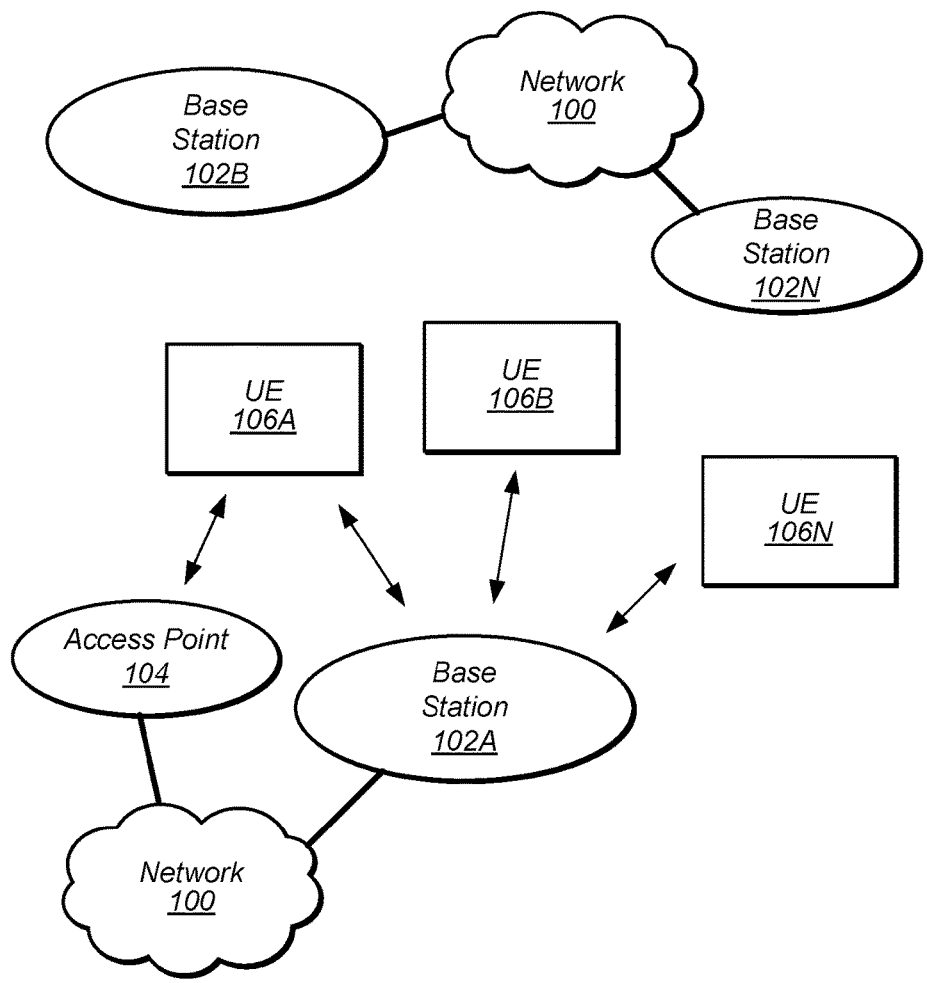
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system that connects to the first computer system over a network, such as the Internet. In the latter instance, the second computer system may provide program instructions to the first computer for execution. The term "memory medium" may include two or more memory mediums that may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices that are mobile or portable and that performs wireless communications. Examples of UE devices include mobile telephones or smart phones (e.g., iPhone™ Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) that is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

IEEE 802.11—refers to technology based on IEEE 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

Figure 2:
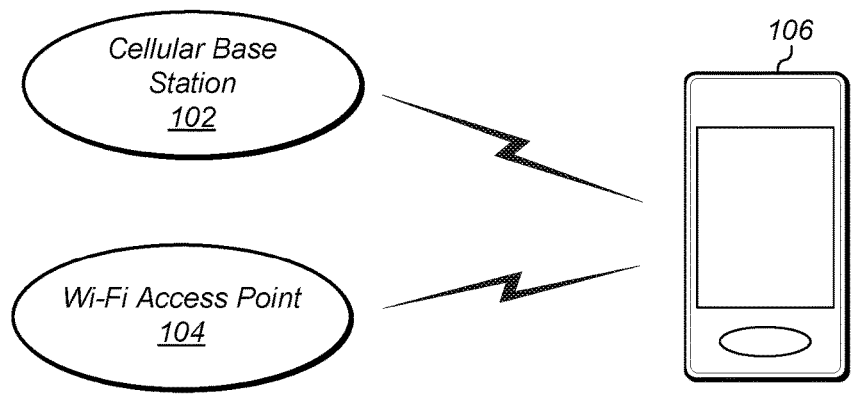
FIG. 2 illustrates an example base station (BS) in communication with an example user equipment (UE) device, according to some embodiments.

FIGS. 1 and 2—Communication System

FIG. 1 illustrates an exemplary (and simplified) wireless communication system in which aspects of the present disclosure may be implemented, according to some embodiments. It is noted that the system of FIG. 1 is only one example of a possible system, and embodiments may be implemented in any of various systems, as desired.

As shown, the exemplary wireless communication system includes a base station 102A, which can communicate over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site (a "cellular base station"), and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc.

Additionally, one or more access points (such as access point 104) may be communicatively coupled to the network 100, and may be within communicative range of one or more UEs 106. The access point(s) may include Wi-Fi access points configured to provide one or more wireless local area networks in a home, workplace, shop, or other environment operated independently of a network operator providing base stations some or all of 102A . . . 102N. Alternatively, or in addition, the access point(s) may include Wi-Fi access points configured to support cellular network offloading and/or otherwise provide wireless communication services in an at least partially coordinated manner with a network operator providing some or all of base stations 102A . . . 102N. Such access points may be collocated with a cellular base station or may be deployed separately from any cellular base stations, as desired. In some instances (e.g., for network-deployed access points), such an access point may have a backhaul communication reference point with a base station (not shown).

Base station 102A and other similar base stations (such as base stations 102B . . . 102N) and possibly access points (such as access point 104) operating according to the same or a different wireless communication standard may thus be provided as a network of cells, which may provide continuous or nearly continuous overlapping service to UEs 106A-N and similar devices over a geographic area via one or more wireless communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations) and/or wireless local area networks (WLANs), which may be referred to as "neighboring cells" or "neighboring WLANs" (e.g., as appropriate), and/or more generally as "neighbors". Such neighbors may also be capable of facilitating communication between user devices and/or between user devices and the network 100. Such neighbors may include "macro" cells, "micro" cells, "pico" cells, "femto" cells, WLANs, and/or cells that provide any of various other granularities of service area size. For example, base stations 102A-102B illustrated in FIG. 1 might provide macro cells, base station 102N might provide a micro cell, and access point 104 might be a Wi-Fi AP that provides a WLAN. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a cellular base station 102 (e.g., one of the base stations 102A through 102N) and a Wi-Fi access point 104, according to some embodiments. The UE 106 may be a device with cellular and Wi-Fi communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
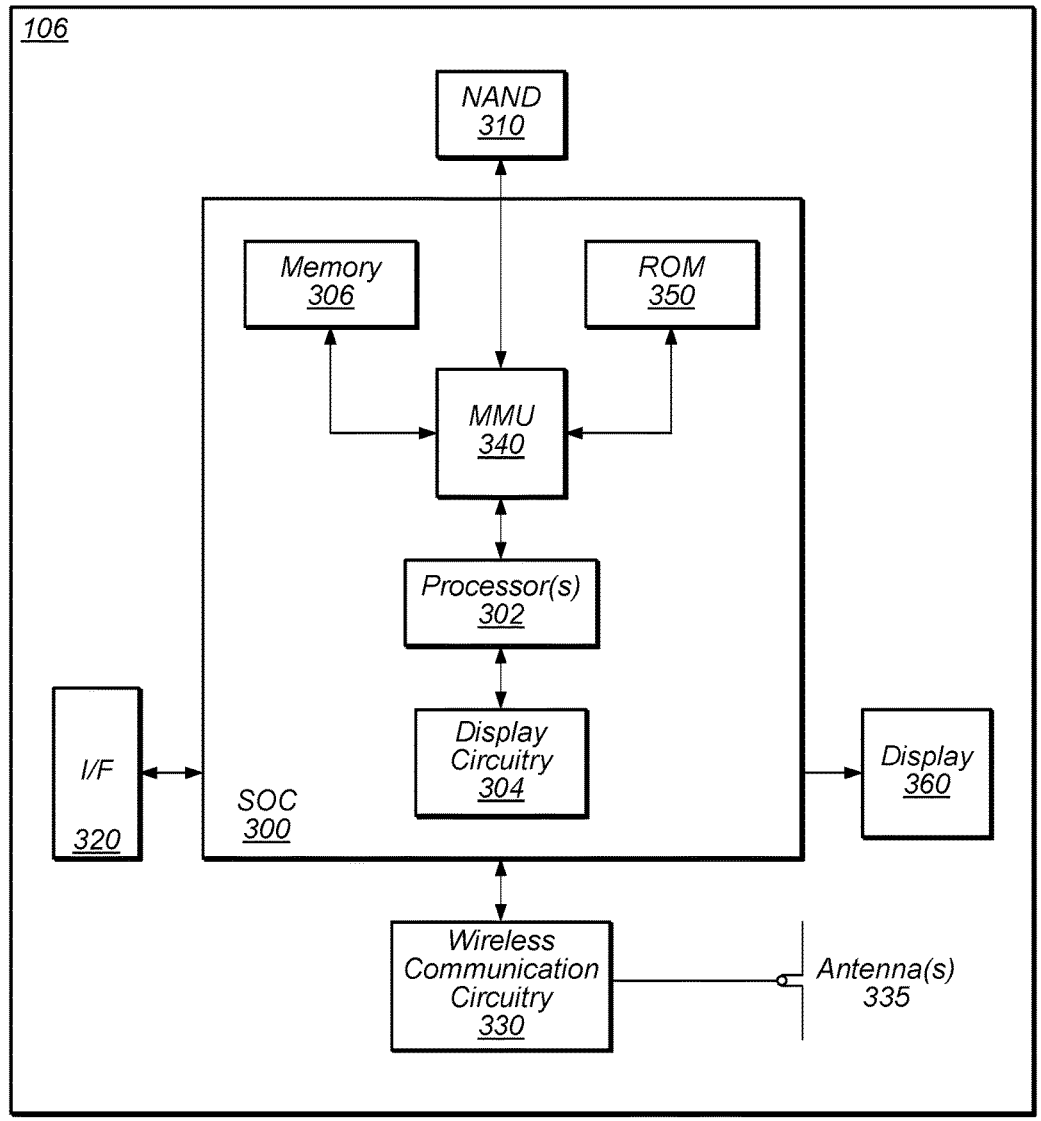
FIG. 3 illustrates an exemplary block diagram of a UE, according to some embodiments.

FIG. 3—Exemplary Block Diagram of a UE Device

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302 that may execute program instructions for the UE 106 and display circuitry 304 that may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, GPS, etc.).

As shown, the UE device 106 may include at least one antenna (and possibly multiple antennas, e.g., for MIMO and/or for implementing different wireless communication technologies, among various possibilities), for performing wireless communication with base stations, access points, and/or other devices. For example, the UE device 106 may use antenna(s) 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

As described further subsequently herein, the UE 106 may include hardware and software components for implementing part or all of the methods described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein.

Figure 4:
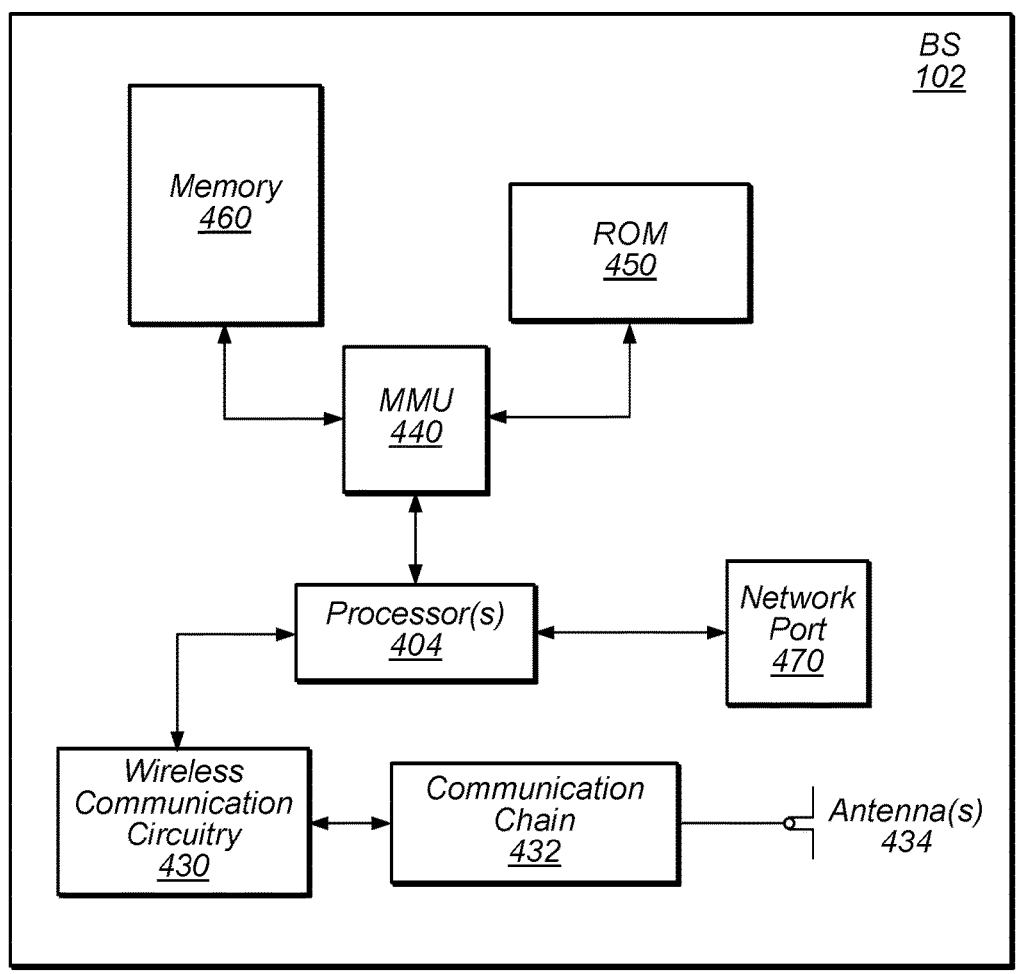
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404, which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via wireless communication circuitry (e.g., radio) 430. The antenna(s) 434 communicates with the wireless communication circuitry 430 via communication chain 432. Communication chain 432 may be a receive chain, a transmit chain or both. The radio 430 may be configured to communicate via various wireless telecommunication standards, including, but not limited to, LTE, LTE-A, GSM, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as either or both of an LTE base station and a Wi-Fi access point. As another possibility, the base station 102 may include a multi-mode radio that is capable of performing communications according to any of multiple wireless communication technologies (e.g., LTE and Wi-Fi, LTE and UMTS, etc.).

The BS 102 may include hardware and software components for implementing or supporting implementation of part or all of the methods described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein.

Figure 5:
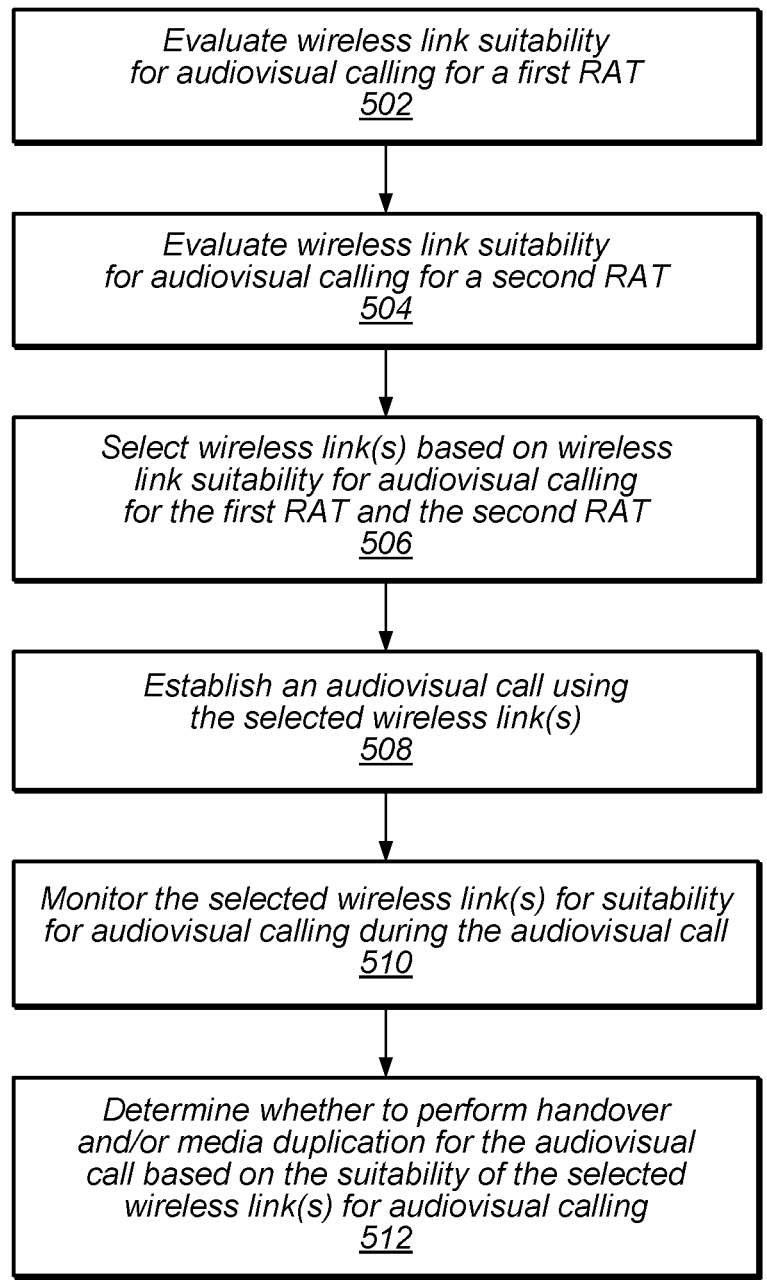
FIG. 5 is a flowchart diagram illustrating an exemplary method for establishing and managing an audiovisual call using wireless communication, according to some embodiments.

FIG. 5—Method for Managing Multiple Radio Access Technologies for an Audiovisual Call An increasingly common use of wireless communication technology may include audiovisual calling. Such calls may include real-time (or near real-time) exchange of both audio and video data between two (or possibly more) endpoints. At least according to some embodiments, audiovisual calling may have non-trivial requirements with respect to link latency and bandwidth availability and reliability in order to provide good performance.

As previously noted, it is increasingly common for wireless devices to be equipped with the capability to communicate using multiple wireless communication technologies. For example, many smart phones are able to communicate using both IEEE 802.11 (Wi-Fi) wireless local area networking (WLAN) and 3GPP (LTE/UMTS/GSM) and/or 3GPP2 (CDMA2000/cdmaOne) cellular radio interfaces, such that a user of such a device may be able to use a cellular data connection simultaneously with a Wi-Fi connection.

Given the potentially high demands an audiovisual call can place on a wireless link, managing and appropriately utilizing wireless links of multiple wireless communication technologies may improve audiovisual calling performance at a wireless device. This may particularly be the case for wireless devices capable of substantial mobility, at least according to some embodiments.

Accordingly, FIG. 5 is a flowchart diagram illustrating a method for managing the use of multiple radio access technologies (RATs) for an audiovisual call, according to some embodiments. The scheme shown in FIG. 5 may be used in conjunction with any of the computer systems or devices shown in the above Figures, among other devices. According to some embodiments, the method may be implemented by a wireless device (e.g., a UE 106 such as illustrated in and described with respect to FIGS. 1-3). In various embodiments, some of the elements of the scheme shown may be performed concurrently, in a different order than shown, substituted for by other elements, or may be omitted. Additional elements may also be performed as desired. As shown, the scheme may operate as follows.

In 502, the wireless device may evaluate wireless link suitability for audiovisual calling for a first RAT. Evaluating the suitability of any wireless link(s) operating according to the first RAT may include determining or estimating certain metrics (that may be specific to the first RAT or non-specific to the first RAT), potentially across multiple layers (e.g., link, transport, application, etc.), and determining whether the values of those metrics meet a set of conditions or criteria (a "first set of conditions") chosen as being indicative of a link that is capable of offering good performance in an audiovisual call.

The metrics evaluated may be any of various possible metrics. As one possibility, the first RAT may be Wi-Fi, and the metrics may relate to current and/or historical wireless medium conditions (e.g., RSSI, packet error rates, retransmission rates, beacon quality indicators, etc.), access point loading conditions (e.g., estimated or calculated number of stations (STAs) served by a Wi-Fi access point providing the wireless link), link backhaul conditions (e.g., maximum bandwidth capacity of the wireless link), and/or any of various other considerations.

In 504, the wireless device may evaluate wireless link suitability for audiovisual calling for a second RAT. Evaluating the suitability of any wireless link(s) operating according to the second RAT may include determining or estimating certain metrics (that may be specific to the second RAT or non-specific to the second RAT), potentially across multiple layers (e.g., link, transport, application, etc.), and determining whether the values of those metrics meet a set of conditions or criteria (a "second set of conditions") chosen as being indicative of a link that is capable of offering good performance in an audiovisual call. Note that while in many instances the first set of conditions and the second set of conditions may differ (e.g., if some or all of the metrics considered differ between the first RAT and the second RAT), it is also possible that the first and second sets of conditions may be similar or identical.

The metrics evaluated may be any of various possible metrics. As one possibility, the second RAT may be a cellular RAT (such as LTE), and the metrics may relate to current and/or historical wireless medium conditions (e.g., RSRP, RSRQ, packet error rates, HARQ and/or RLC retransmission rates, etc.), base station loading and/or backhaul conditions (e.g., estimated percentage or raw number of resource blocks (RBs) available and/or in use for a cell providing the wireless link), and/or any of various other considerations.

In 506, one or more wireless links may be selected for an audiovisual call based on the wireless link suitability for audiovisual calling for the first RAT and the second RAT. According to some embodiments, the first RAT may be prioritized over the second RAT. For example, if there is a wireless link that operates according to the first RAT available that is expected to provide good performance for audiovisual calling (e.g., that meets the first set of conditions), that wireless link may be selected for the audiovisual call. If the wireless link that operates according to the first RAT is not expected to provide good performance for audiovisual calling (e.g., does not meet the first set of conditions), and a wireless link that operates according to the second RAT is expected to provide good performance for audiovisual calling (e.g., meets the second set of conditions), both wireless links (e.g., both the wireless link operating according to the first RAT and the wireless link operating according to the second RAT) may be selected for the audiovisual call. As another possibility, if there is no wireless link that operates according to the second RAT that is considered suitable for audiovisual calling, a wireless link operating according to the first RAT may be selected, possibly even if it does not meet the first set of conditions. As a still further possibility, if there is no wireless link that operates according to the first RAT that is considered suitable for audiovisual calling, a wireless link operating according to the second RAT may be selected, possibly even if it does not meet the second set of conditions.

In 508, the audiovisual call may be established using the selected wireless link(s). Thus, if just a wireless link that operates according to the first RAT is selected, the audiovisual call may be established using the wireless link that operates according to the first RAT, such that content/media (e.g., audio and/or video data) of the audiovisual call is communicated using just the wireless link that operates according to the first RAT. Similarly, if just a wireless link that operates according to the second RAT is selected, the audiovisual call may be established using the wireless link that operates according to the second RAT, such that content/media of the audiovisual call is communicated using just the wireless link that operates according to the second RAT. If both a wireless link that operates according to the first RAT and a wireless link that operates according to the second RAT are selected, the audiovisual call may be established using both wireless links, such that (at least some of) the content/media of the audiovisual call is communicated in duplicate using both wireless links.

In 510, the selected wireless link(s) may be monitored for suitability for audiovisual calling during the audiovisual call, e.g., on an ongoing basis. Such monitoring may include determining or estimating any or all of the same metrics as when initially evaluating wireless link suitability of wireless links available according to the first RAT and the second RAT, according to some embodiments. Additionally or alternatively, according to some embodiments, one or more metrics relating to the audiovisual call may be monitored on an ongoing basis.

For example, as one possibility, an effective media erasure rate (potentially including an effective audio erasure rate, an effective video erasure rate, and/or a combined effective audiovisual erasure rate) of the audiovisual call using the selected wireless link(s) may be estimated. The basic erasure rate may be based on how often a media layer of the wireless device did not have media (audio and/or video data) to present. Note that this may differ from a media layer (e.g., realtime transfer protocol or RTP) packet loss rate, e.g., as media (e.g., video) transmission redundancy may mitigate some or all packet loss, and/or out-of-order packets may cause media to not be available at its specified playback time even if the media is eventually received.

According to some embodiments, the estimated effective erasure rate may include modification to the basic erasure rate to remove erasures that do not affect user experience. For example, if silence (e.g., silence insertion descriptor or SID) packets are normally exchanged as part of the audio stream of the audiovisual call, the basic erasure rate may be modified to remove the impact of any erasure of those packets. Thus, according to an example scenario in which SID packets are sent every 160 ms (compared to non-silence voice packets sent every 20 ms), SID erasures detected may be multiplied by seven and subtracted from the total erasure count, with the result divided by the total number of playback periods, to estimate the effective media erasure rate. Note that while the video stream of the audiovisual call may not include silence packets, as previously noted, in some instances video packet loss may not cause media erasure, e.g., as a result of media duplication, and in such cases those video packets lost that do not contributed to media erasure may also be discounted from the effective media erasure rate.

As another possible metric that may be monitored, the wireless device may estimate a moving average media erasure rate for the audiovisual call using the selected wireless link(s). Such a moving average may be calculated in any of various ways, e.g., depending on a desired averaging window. As one possible example, the following formula may be used to calculate a moving average speech erasure rate:

$$movAvgRxPktLoss_{new} = \frac{(\alpha - \beta)movAvgRxPktLoss_{old} + \alpha * rxSpeechPktLoss}{\beta}$$

where:

$$rxSpeechPktLoss = (ErasuresInSpeech * 100)/PlayBacks$$

and $\alpha$ and $\beta$ are used to configure the averaging window.

As still another possible metric that may be monitored, the wireless device may estimate a moving average nominal jitter buffer size for the audiovisual call using the selected wireless link(s). Such a moving average may be calculated in any of various ways, e.g., depending on a desired averaging window. As one possible example, the following formula may be used to calculate a moving average nominal jitter buffer size:

$$movAvgNominalJitterBufferDelay_{new} = \frac{(\beta - \alpha)movAvgNominalJitterBufferDelay_{old} + \alpha * nominalJitterBufferDelay}{\beta}$$

where $\alpha$ and $\beta$ are used to configure the averaging window. Note that the values of $\alpha$ and $\beta$ used for the moving average speech erasure rate and the moving average nominal jitter buffer size maybe the same or different, as desired.

A further set of metrics that may be monitored may include physical layer (PHY) rate metrics. For example, a nominal transmit PHY rate and a nominal receive PHY rate for the wireless link (or for each of the wireless links) on which the audiovisual call is established may be monitored. In addition, an effective transmit PHY rate and an effective receive PHY rate may be estimated, e.g., by modifying the nominal transmit and receive PHY rates to account for packet loss (e.g., using packet erro rate or PER), for example using the following formulas:

EffectiveTXPHYrate=(TXPHYrate*(1−TXRe-tryPER))

EffectiveRXPHYrate=(RXPHYrate*(1−RXRe-tryPER))

As yet another possibility, an end-to-end (e.g., transport or L3) bandwidth (e.g., including transmit end-to-end bandwidth, receive end-to-end bandwidth, and/or a combination thereof) for the wireless link (or for each of the wireless links) on which the audiovisual call is established may be monitored. The end-to-end bandwidth may be estimated using a combination of physical layer, media access control layer, load, and historical bandwidth information, according to some embodiments.

According to some embodiments, the wireless device may estimate minimum and maximum available bandwidths for a Wi-Fi link using PHY rate and packet loss, Wi-Fi network load and station count or scaling factor (e.g., calculated based on estimated bandwidth and achieved bandwidth during a video streaming session), and backhaul capacity of the Wi-Fi link (e.g., estimated based on historical values of maximum achieved L3 data rate observed for a given service set identifier (SSID)/basic service set identifier (BSSID). If desired, moving average(s) for the estimated bandwidth(s) may be calculated, e.g., over a window such as 15 s, 30 s, 60 s, etc.

As an example, the maximum available PHY bandwidth may be calculated as a function of the PHY data rate, load, and packet loss experienced by the Wi-Fi link. The minimum available PHY bandwidth may be calculated by dividing the estimated maximum available PHY bandwidth by a function of the station count in the Wi-Fi network. The specific function used may depend on what information and/or assumptions are used regarding how the Wi-Fi network performs load distribution. The L3 bandwidth using the Wi-Fi link may be estimated by calculating a function of (average packet size)*8 divided by packet duration, where the packet duration itself is estimated using a function of average packet size and the estimated PHY bandwidth. Note that according to some embodiments, the effect of 802.11n/802.11ac MAC level aggregation may not be considered, as (at least according to some embodiments) such a feature may not generally be used for audiovisual calls. Note further that if/when station count is not available, adjustments may be made to the formula for estimating the minimum available PHY bandwidth to account for the inexact information available in such scenarios.

Such metrics may be used to determine the suitability of a wireless link or links for audiovisual calling in any of a variety of ways, as desired. As one possible use, certain metrics may be monitored to determine if a "walkout" scenario has occurred when a Wi-Fi link is in use, and to distinguish such a scenario from other (potentially temporary) reasons for Wi-Fi link metrics to appear to become unsuitable for audiovisual calling, such as a spike in packet loss for an Internet connection of the Wi-Fi network or end-to-end congestion. A walkout scenario may occur when a wireless device moves (e.g., is carried by a user) away from (or otherwise in a direction of reduced signal strength with respect to) an access point providing the Wi-Fi link, causing the first hop (the Wi-Fi link, in this case) of the audiovisual call to deteriorate. Such a scenario may be cause to trigger handover to a different wireless link (e.g., a different Wi-Fi link or a cellular link) and/or media duplication using an additional wireless link(e.g., a cellular link).

For example, effective media erasure rate may be one important indicator of suitability of a wireless link for audiovisual calling. If the effective media erasure rate rises above an effective media erasure rate threshold, and this is accompanied by at least one indication that the first hop Wi-Fi may have deteriorated, it may be determined that a walkout scenario is occurring and the first hop Wi-Fi link used for the audiovisual call may be determined to be unsuitable for audiovisual calling. Possible metrics that could be used to identify when the first hop Wi-Fi is deteriorated, that could be used in combination with the effective media erasure rate, may include any or all of Wi-Fi RSSI level (e.g., being below an RSSI threshold may indicate poor Wi-Fi conditions), MAC layer receive retransmissions (e.g., occurring at above a receive retransmission rate threshold may indicate poor Wi-Fi conditions), MAC layer transmit retransmissions (e.g., occurring at above a transmit retransmission rate threshold may indicate poor Wi-Fi conditions), and/or motion level of the wireless device (e.g., a motion state above a motion threshold may indicate an increased likelihood of a walkout scenario). Note that if effective media erasure rate is above the effective media erasure rate threshold but all of the monitored Wi-Fi link layer metrics and motion state of the wireless device are within acceptable ranges/states, it may be determined that a walkout scenario is not (yet) occurring.

In addition (or as an alternative) to quickly detecting walkout scenarios, the effect of sustained erasure and bad user experience, e.g., due to a poor Internet connection, may be considered when monitoring the suitability for audiovisual calling of a wireless link, potentially even if there is no correlation between erasure and link layer metrics or motion state.

As one such possibility for monitoring a wireless link for sustained end-to-end link problems, moving average media erasure rate may be considered as part of determining whether a wireless link being used for the audiovisual call is suitable for audiovisual calling. For example, if the moving average media erasure rate rises above a moving average media erasure rate threshold, the wireless link may be deemed unsuitable for audiovisual calling.

As another such possibility for monitoring a wireless link for sustained end-to-end link problems, moving average nominal jitter buffer delay may be considered as part of determining whether a wireless link being used for the audiovisual call is suitable for audiovisual calling. For example, if the moving average nominal jitter buffer delay rises above a moving average nominal jitter buffer delay threshold, the wireless link may be deemed unsuitable for audiovisual calling.

Note that in addition to monitoring the wireless link(s) currently being used for the audiovisual call, other possible wireless links may also be evaluated/monitored for suitability for audiovisual calling. For example, if the audiovisual call is established using a wireless link that operates according to the first RAT, the suitability of any wireless links that operate according to the second RAT (or another RAT) may also be monitored for audiovisual calling suitability during the audiovisual call.

In 512, handover and/or media duplication decisions may be made based at least in part on the suitability of the selected wireless link(s) for audiovisual calling. The availability, suitability for audiovisual calling, and RAT of any other monitored wireless links may also be considered as part of handover and/or media duplication decisions. Additionally, deciding to perform handover and/or start/stop media duplication may also depend on whether the audiovisual call currently uses a wireless link according to the first RAT, a wireless link according to the second RAT, or wireless links according to both the first and second RAT, according to some embodiments.

For example, if the audiovisual call is established using a wireless link according to the first RAT, and the wireless link according to the first RAT is determined to be unsuitable (e.g., if a walkout scenario is detected based on effective media erasure rate, link layer metrics, and motion state, and/or if sustained end-to-end link performance deterioration is detected based on moving average media erasure rate and/or moving average nominal jitter buffer delay), it may be determined to perform handover and/or media duplication (e.g., depending on the availability of the wireless link according to the first RAT and/or the availability of a wireless link according to the second RAT) of the audiovisual call.

If it is determined to perform handover of the audiovisual call, the audiovisual call may be handed over to a different wireless link, that may operate according to a different RAT (e.g., from the first RAT to the second RAT or vice versa).

If it is determined to perform media duplication of the audiovisual call, media duplication may be implemented such that content of the audiovisual call is transmitted (e.g., in duplicate) on multiple selected wireless links, that may operate according to different RATs (e.g., both the first RAT and the second RAT).

If it is determined to stop performing media duplication of the audiovisual call, media duplication may no longer be implemented, such that content of the audiovisual call is transmitted using just one selected wireless link, e.g., instead of using multiple wireless links.

At least according to some embodiments, monitoring wireless links for suitability for audiovisual calling, and performing handover and starting and stopping media duplication based on such monitoring, such as described herein, may improve audiovisual calling user experience by potentially providing a more seamless audiovisual calling experience, while still avoiding excessive power usage and (e.g., if desired) cellular data usage by performing media duplication and using a cellular link relatively minimally when it can be avoided without negatively affecting audiovisual call quality.

Note that in addition to determining when to trigger handover and/or media duplication for an audiovisual call, according to some embodiments, some or all of the wireless link metrics monitored during an audiovisual call may be used as part of media layer adaptation decisions. For example, using first hop metrics may enable a quicker response time to adapt the media stream to changing network conditions than end-to-end metrics such as end-to-end packet loss rate and available throughput. Such end-to-end metrics require a complete round trip to acquire new measurements and adapt to them, and such delays in receiving newer measurements may be further increased in lossy conditions. Further, throughput measurements require a large amount of data to be sent in burst, and at least for some audiovisual calling applications, this may occur relatively infrequently, e.g., once per second (other values are also possible). In some embodiments, end-to-end packet loss measurements may be performed only for audio packets. Thus, as one possibility, a first hop metric such as packet loss rate over a Wi-Fi first hop may be useful for determining when to add redundancy to a media stream, e.g., such that redundancy is increased as packet loss rate increases, possibly unless the access point is loaded. As another possibility, an available throughput over a Wi-Fi first hop metric may be used to supplement end-to-end throughput estimation and adapt the media stream (e.g., by adjusting codec bit rate, forward error correction, bundling media packets together, etc.) based on the computed throughput.

FIGS. 6-9

FIGS. 6-9 and the description thereof are provided by way of example, and are not intended to be limiting to the disclosure as a whole. Numerous alternatives to and variations of the details provided herein below are possible and should be considered within the scope of the present disclosure.

Figure 6:
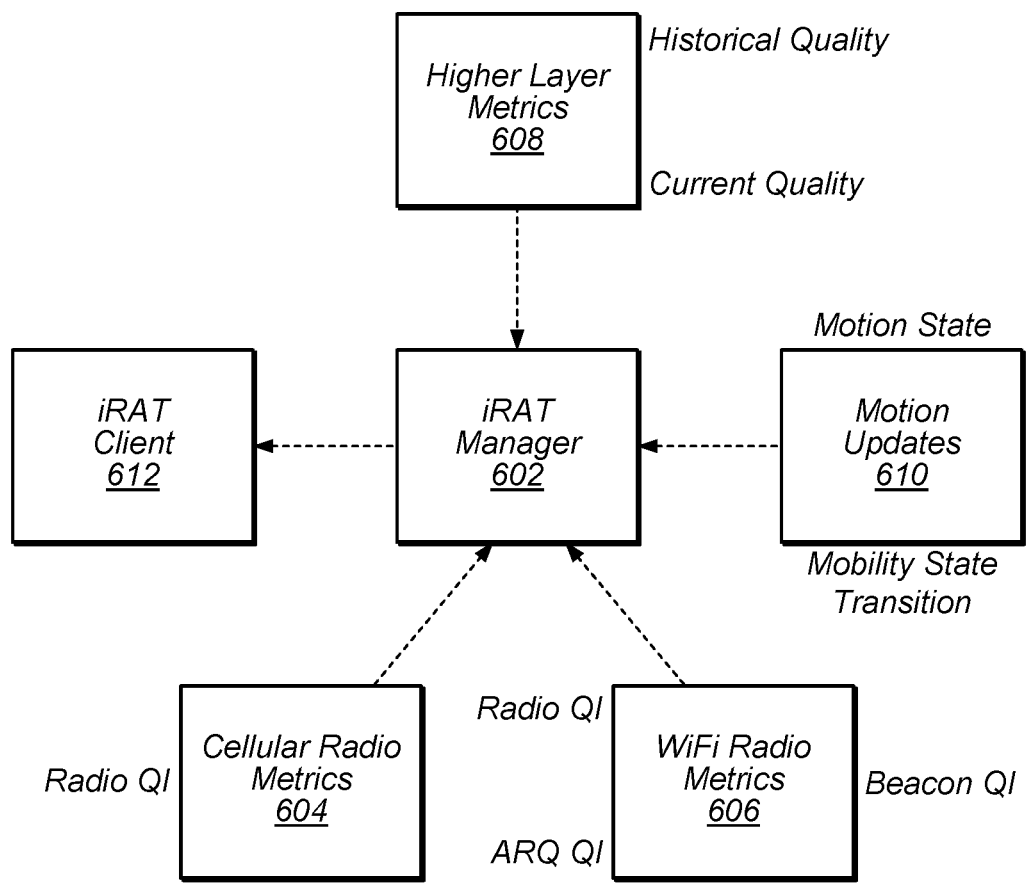
FIG. 6 illustrates an exemplary block diagram of a logical framework for managing multiple radio access technologies, according to some embodiments.

FIG. 6 is a block diagram illustrating an example logical framework that may be used for inter RAT (iRAT) management for an application configured to utilize multiple RATs, such as an voice (e.g., VoIP) calling or audiovisual calling application.

As shown, an iRAT manager 602 may receive updates from various modules configured to monitor metrics that may be useful for deciding when to perform handover and/or media duplication between the radio access technologies monitored. In the example framework of FIG. 6, the iRAT manager 602 may receive link layer metrics, including one or more cellular radio quality indicators, from a cellular radio metrics module 604. Similarly, the iRAT manager 602 may receive link layer metrics, including one or more Wi-Fi radio quality indicators, beacon quality indicators, and/or automatic repeat request (ARQ) quality indicators, from a WiFi radio metrics module 606. The iRAT manager 602 may also receive indications relating to higher layer (e.g., transport and application layers) metrics such as historical quality and current quality experienced from a higher layer metrics module 608. Additionally, the iRAT manager 602 may receive motion information, such as the current motion state and indications when mobility state transitions occur, from a motion updates module 610. Using such information, the iRAT manager 602 may be able to make a determination regarding whether to utilize a Wi-Fi link, a cellular link, or both a Wi-Fi link and a cellular link available to the wireless device, and may provide such information to an iRAT client 612.

Figure 7:
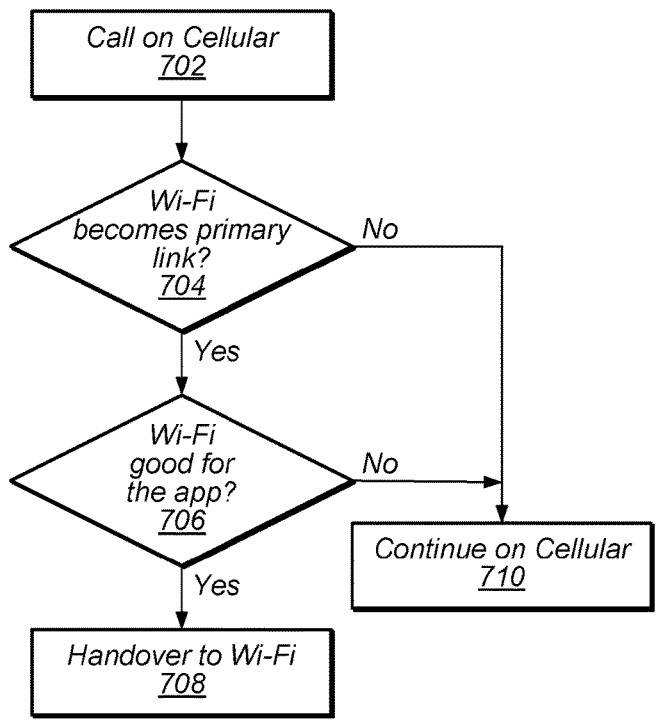
FIGS. 7-9 are flowchart diagrams illustrating examples of possible further details of the method of FIG. 5, according to some embodiments.
Figure 8:
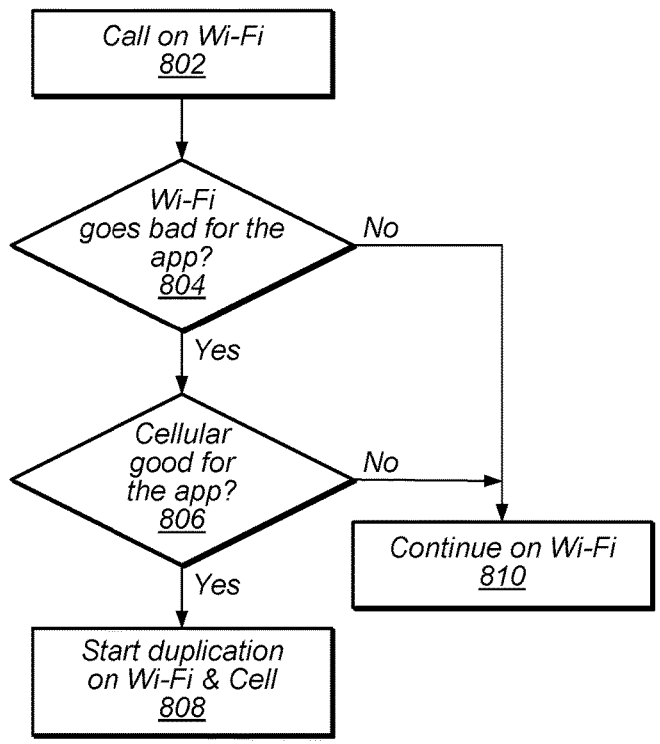
Figure 9:
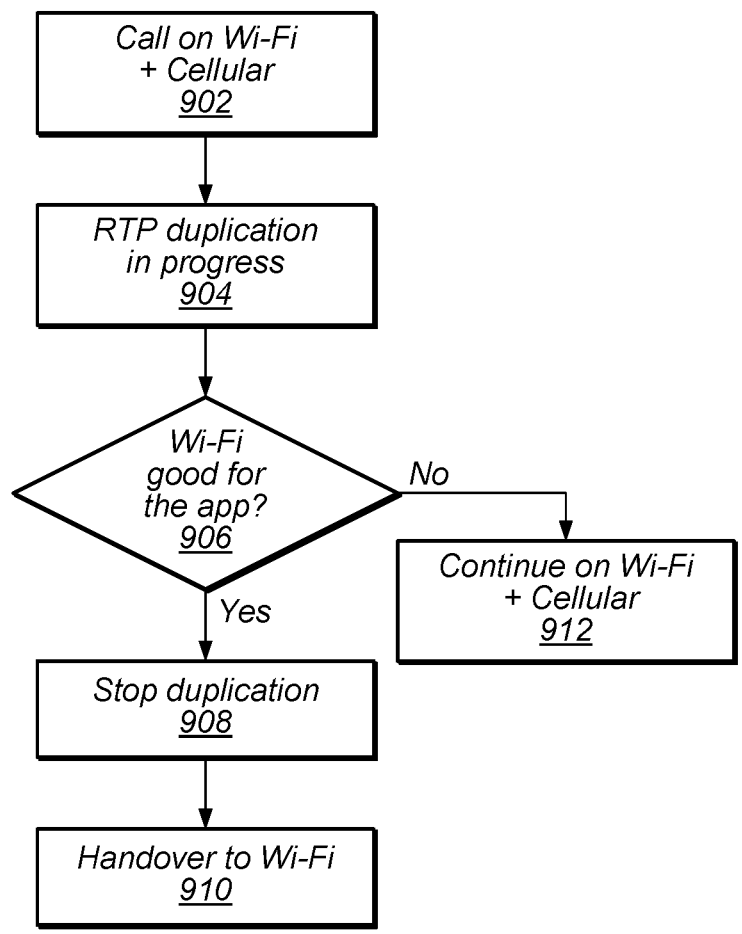

FIGS. 7-9 are flowchart diagrams illustrating additional exemplary possible aspects of the method of FIG. 5, according to some embodiments. The schemes shown in FIGS. 7-9 may be used in conjunction with any of the computer systems or devices shown in the above Figures, among other devices. According to some embodiments, the methods may be implemented by a wireless device (e.g., a UE 106 such as illustrated in and described with respect to FIGS. 1-3). In various embodiments, some of the elements of the scheme shown may be performed concurrently, in a different order than shown, substituted for by other elements, or may be omitted. Additional elements may also be performed as desired.

FIG. 7 is a flowchart diagram illustrating an exemplary process for potentially performing handover of an audiovisual call when entering Wi-Fi coverage, according to some embodiments. As shown, the scheme may operate as follows. In 702, the call may be on a cellular link. In 704, it may be determined whether a Wi-Fi link has become the primary wireless link for the wireless device. If a Wi-Fi link has become the primary wireless link for the wireless device, it may be determined in 706 whether the Wi-Fi link is suitable for audiovisual calling. This may be based on radio quality indicators, link quality indicators, load quality indicators, and/or any other considerations, potentially including any of those metrics and techniques for determining wireless link suitability for audiovisual calling described previously herein with respect to FIG. 5, as desired. If it is determined that the Wi-Fi link is suitable for audiovisual calling, the method may proceed to step 708, in which the audiovisual call may be handed over to the Wi-Fi link. If Wi-Fi does not become the primary wireless link for the device, or does become the primary wireless link but the Wi-Fi link is not suitable for audiovisual calling, the method may proceed to step 710, in which the audiovisual call may continue on the cellular link.

FIG. 8 is a flowchart diagram illustrating an exemplary process for potentially performing handover of an audiovisual call when leaving Wi-Fi coverage, according to some embodiments. As shown, the scheme may operate as follows. In 802, the call may be on a Wi-Fi link. In 804, it may be determined whether the Wi-Fi link has become unsuitable for audiovisual calling. This may be based on radio quality indicators, link quality indicators, estimated end-to-end bandwidth, PHY rate, current or moving average media average media erasure rate, moving average nominal jitter buffer delay, and/or any other considerations, potentially including any of those metrics and techniques for determining wireless link suitability for audiovisual calling described previously herein with respect to FIG. 5, as desired. If the Wi-Fi link has become unsuitable for audiovisual calling, it may be determined in 806 whether a cellular link of the wireless device is suitable for audiovisual calling. This may be based on radio quality indicators, serving cell type, and/or any other considerations, potentially including any of those metrics and techniques for determining wireless link suitability for audiovisual calling described previously herein with respect to FIG. 5, as desired. If it is determined that the cellular link is suitable for audiovisual calling, the method may proceed to step 808, in which media duplication on both the Wi-Fi link and the cellular link may be triggered. If Wi-Fi remains suitable for audiovisual calling, or does become unsuitable for audiovisual calling but the cellular link is also not suitable for audiovisual calling, the method may proceed to step 810, in which the audiovisual call may continue on the Wi-Fi link.

FIG. 9 is a flowchart diagram illustrating an exemplary process for potentially performing handover of an audiovisual call when Wi-Fi coverage improves, according to some embodiments. As shown, the scheme may operate as follows. In 902, the call may be on both a Wi-Fi link and a cellular link. In 904, RTP media duplication may be used, such that content (e.g., RTP video packets) of the audiovisual call are transmitted on both the Wi-Fi link and the cellular link. In 906, it may be determined whether the Wi-Fi link has become suitable for audiovisual calling. This may be based on radio quality indicators, link quality indicators, estimated end-to-end bandwidth, PHY rate, current or moving average media average media erasure rate, moving average nominal jitter buffer delay, and/or any other considerations, potentially including any of those metrics and techniques for determining wireless link suitability for audiovisual calling described previously herein with respect to FIG. 5, as desired. If the Wi-Fi link has become suitable for audiovisual calling, it may be determined in 908 to stop duplication. Proceeding to step 910, the audiovisual call may be handed over to the Wi-Fi link, e.g., such that the cellular link is no longer used for the audiovisual call. If the Wi-Fi link has not become suitable for audiovisual calling, the method may proceed to step 912, in which the call may continue on both the Wi-Fi link and the cellular link.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising a processing element configured to cause a wireless device to:
evaluate a wireless local area network (WLAN) link for audiovisual calling suitability;
evaluate a cellular link for audiovisual calling suitability; and
establish an audiovisual call using one or more of the WLAN link or the cellular link,
wherein evaluating the WLAN link for audiovisual calling suitability comprises monitoring a plurality of WLAN metrics across a plurality of layers to determine whether the WLAN link meets a first set of conditions, wherein the plurality of WLAN metrics comprise an effective media erasure rate of the WLAN link, wherein the effective media erasure rate is calculated based at least in part on how often a media layer does not have media to present at a specified playback time period, wherein loss of silence insertion descriptor packets does not impact the effective media erasure rate;
wherein evaluating the cellular link for audiovisual calling suitability comprises monitoring a plurality of cellular metrics across a plurality of layers to determine whether the cellular link meets a second set of conditions, wherein the plurality of cellular metrics comprise an effective media erasure rate of the cellular link,
wherein the audiovisual call is established using just the WLAN link when the WLAN link meets the first set of conditions,
wherein the audiovisual call is established using both the WLAN link and the cellular link when the WLAN link does not meet the first set of conditions and if the cellular link meets the second set of conditions.

2. The apparatus of claim 1,
wherein when the audiovisual call is established using both the WLAN link and the cellular link, content of the audiovisual call is duplicated on each of the WLAN link and the cellular link.

3. The apparatus of claim 1, wherein the processing element is further configured to cause the wireless device to, when the audiovisual call is established using just the WLAN link:
monitor the media erasure rate of the WLAN link; and
determine whether to perform handover of the audiovisual call from the WLAN link to the cellular link or media duplication of the audiovisual call based at least in part on the effective media erasure rate of the audiovisual call.

4. The apparatus of claim 3,
wherein when the audiovisual call is established using just the WLAN link, the processing element is further configured to cause the wireless device to perform handover to the cellular link or media duplication on the WLAN link and the cellular link if the effective media erasure rate of the audiovisual call rises above an effective media erasure rate threshold and if one or more WLAN link layer metrics indicative of poor WLAN link quality are detected or if device motion over a device motion threshold is detected.

5. The apparatus of claim 1, wherein the processing element is further configured to cause the wireless device to:
monitor a moving average media erasure rate of the audiovisual call;
monitor a moving average nominal jitter buffer size of the audiovisual call; and
determine whether to perform handover of the audiovisual call to a different wireless link or media duplication of the audiovisual call using multiple wireless links based on one or more of the moving average media erasure rate or the moving average nominal jitter buffer size of the audiovisual call.

6. The apparatus of claim 1, wherein to evaluate the WLAN link for audiovisual calling suitability, the processing element is further configured to cause the wireless device to:
estimate end-to-end bandwidth of the WLAN link based on physical layer, media access control layer, load, and historical bandwidth information for the WLAN link.

7. The apparatus of claim 1, wherein to evaluate the Wi-Fi link for audiovisual calling suitability, the processing element is further configured to cause the wireless device to:

determine effective physical layer (PHY) transmit and receive rates of the Wi-Fi link based on nominal PHY transmit and receive rates and PHY transmit and receive retransmission packet error rates.

8. A wireless device, comprising:
an antenna;
a radio operably coupled to the antenna; and
a processing element operably coupled to the radio;
wherein the antenna, radio, and processing element are configured to:
evaluate wireless link suitability for an audiovisual call for a first radio access technology (RAT), wherein said evaluating the wireless link suitability for the first RAT comprises determining a first plurality of metrics, including a first metric, wherein the first metric is calculated based at least in part on how often a media layer of the wireless device does not have media to present at a specified playback time period when using a wireless link for the audiovisual call, wherein redundant media packet losses are not considered to cause the media layer of the wireless device to not have media to present according to the first metric;
evaluate wireless link suitability for an audiovisual call for a second RAT, wherein said evaluating the wireless link suitability for the second RAT comprises determining a second plurality of metrics, including the first metric;
select one or more wireless links on which to establish an audiovisual call based on evaluating wireless link suitability for an audiovisual call for the first RAT and the second RAT; and
establish the audiovisual call using the selected one or more wireless links.

9. The wireless device of claim 8, wherein the selected one or more wireless links comprise a first wireless link operating according to the first RAT, wherein the antenna, radio, and processing element are further configured to:
monitor the first wireless link for suitability for an audiovisual call during the audiovisual call;
monitor a second wireless link operating according to the second RAT for suitability for an audiovisual call during the audiovisual call.

10. The wireless device of claim 9, wherein the antenna, radio, and processing element are further configured to:
determine to perform handover of the audiovisual call to the second wireless link based on monitoring the first wireless link and the second wireless link for suitability for an audiovisual call during the audiovisual call; and
perform handover of the audiovisual call to the second wireless link.

11. The wireless device of claim 9, wherein the antenna, radio, and processing element are further configured to:
determine to perform media duplication of the audiovisual call on both the first wireless link and the second wireless link based on monitoring the first wireless link and the second wireless link for suitability for an audiovisual call during the audiovisual call; and
perform media duplication of the audiovisual call on both the first wireless link and the second wireless link.

12. The wireless device of claim 9, wherein to monitor the first wireless link, the antenna, radio, and processing element are further configured to determine one or more of:
the first effective media erasure rate of the audiovisual call using the first wireless link;
an estimated moving average media erasure rate of the audiovisual call using the first wireless link;
an estimated moving average nominal jitter buffer size of the audiovisual call using the first wireless link;
an estimated end-to-end bandwidth using the first wireless link; or
an effective physical layer rate of the first wireless link.

13. The wireless device of claim 8, wherein the wireless device is further configured to:
monitor one or more first hop metrics for the selected one or more wireless links; and
perform media layer adaptation for the audiovisual call based at least in part on the one or more first hop metrics, wherein performing media layer adaptation comprises selecting one or more of forward error correction, duplication, or codec bitrate for the audiovisual call at a media layer of the wireless device.

14. A method, comprising:
by a first device:
establishing an audiovisual call with a second device using one or more wireless links;
monitoring the one or more wireless links for suitability for an audiovisual call, wherein said monitoring the one or more wireless links for suitability for the audiovisual call comprises determining a metric for the one or more wireless links that is calculated based at least in part on how often a media layer of the first device does not have media to present at a specified playback time period when using the one or more wireless links for the audiovisual call, wherein the media layer of the first device is considered to have media to present notwithstanding losses of silence insertion descriptor packets or losses of redundant media packets; and
determining whether to perform handover of the audiovisual call to one or more different wireless links or to implement media duplication on multiple wireless links for the audiovisual call based at least in part on the metric.

15. The method of claim 14, further comprising:
determining that an effective media erasure rate of the audiovisual call is above an effective media erasure rate threshold;
determining that one or more first hop link metrics of the one or more wireless links are below one or more first hop link metric thresholds; and
determining to perform handover of the audiovisual call to one or more different wireless links or to implement media duplication on multiple wireless links for the audiovisual call based at least in part on determining that the effective media erasure rate of the audiovisual call is above the effective media erasure rate threshold and determining that the one or more first hop link metrics of the one or more wireless links are below the one or more first hop link metric thresholds.

16. The method of claim 14, further comprising:
determining that the effective media erasure rate of the audiovisual call is above an effective media erasure rate threshold;
determining that a motion state of the first device is above a motion threshold; and
determining to perform handover of the audiovisual call to one or more different wireless links or to implement media duplication on multiple wireless links for the audiovisual call based at least in part on determining that the effective media erasure rate of the audiovisual call is above the effective media erasure rate threshold and determining that the motion state of the first device is above the motion threshold.

17. The method of claim 14, further comprising:
  determining that a moving average media erasure rate for the audiovisual call is above a moving average media erasure rate threshold; and
  determining to perform handover of the audiovisual call to one or more different wireless links or to implement media duplication on multiple wireless links for the audiovisual call based at least in part on determining that the moving average media erasure rate for the audiovisual call is above the moving average media erasure rate threshold.

18. The method of claim 14, further comprising:
  determining that a moving average jitter buffer size for the audiovisual call is above a moving average jitter buffer size threshold; and
  determining to perform handover of the audiovisual call to one or more different wireless links or to implement media duplication on multiple wireless links for the audiovisual call based at least in part on determining that the moving average jitter buffer size for the audiovisual call is above the moving average jitter buffer size threshold.

19. The method of claim 14, wherein the one or more wireless links used to establish the audiovisual call comprise a WLAN link, wherein the method further comprises:
  determining an effective physical layer rate of the WLAN link,
  wherein the WLAN link is selected for establishing the audiovisual call based at least in part on the determined effective physical layer rate.

20. The method of claim 14, wherein the one or more wireless links used to establish the audiovisual call comprise a WLAN link, wherein the method further comprises:
  estimating an end-to-end bandwidth of the WLAN link, wherein the WLAN link is selected for establishing the audiovisual call based at least in part on the estimated end-to-end bandwidth of the WLAN link.

\* \* \* \* \*